US009013553B2

(12) United States Patent
Stephan (10) Patent No.: US 9,013,553 B2
(45) Date of Patent: Apr. 21, 2015

(54) VIRTUAL ADVERTISING PLATFORM

(75) Inventor: Karel Paul Stephan, The Bayshore (SG)

(73) Assignee: Rocks International Group Pte Ltd., The Bayshore (SG)

(*) Notice: Subject to any disclaimer, the term of this patent is extended or adjusted under 35 U.S.C. 154(b) by 660 days.

(21) Appl. No.: 13/405,015

(22) Filed: Feb. 24, 2012

(65) Prior Publication Data

US 2013/0063561 A1 Mar. 14, 2013

(30) Foreign Application Priority Data

Aug. 31, 2011 (GB) .................................. 1114938.2
Sep. 14, 2011 (SG) .............................. 201106633-9
Nov. 4, 2011 (GB) .................................... 119612.8

(51) Int. Cl.
*H04N 13/02* (2006.01)
*G06T 15/04* (2011.01)

(52) U.S. Cl.
CPC .................................. *H04N 13/026* (2013.01)

(58) Field of Classification Search
CPC ....... H04N 13/02; H04N 21/812; G06T 15/04
USPC ............................................. 348/46, E13.074
See application file for complete search history.

(56) References Cited

U.S. PATENT DOCUMENTS

2004/0239670 A1* 12/2004 Marks ........................... 345/419
2005/0166224 A1*  7/2005 Ficco ............................. 725/35
2006/0244757 A1* 11/2006 Fang et al. .................... 345/582
2008/0104634 A1*  5/2008 Gajdos et al. ................... 725/36
2009/0295791 A1* 12/2009 Aguera y Arcas et al. ... 345/419
2011/0107368 A1*  5/2011 Rouse et al. .................... 725/34
2012/0314029 A1* 12/2012 Boyce et al. .................... 348/43

FOREIGN PATENT DOCUMENTS

WO        2013030634 A1    3/2013

OTHER PUBLICATIONS

Hitesh, Shah et al., "Automated Billboard Insertion in Video", Computer Vision A Accv 2007; [Lecture Notes in Computer Science], Springer Berlin Heidelberg, Berlin, Heidelberg,Nov. 18, 2007, pp. 240-250.
PCT/IB2012/000363, "International Application Serial No. PCT/IB2012/000363, International Search Report and Written Opinion mailed Jan. 23, 2013", Rocks International Group PTE Ltd., 17 pages.

* cited by examiner

*Primary Examiner* — Christopher S Kelley
*Assistant Examiner* — Deirdre Beasley
(74) *Attorney, Agent, or Firm* — Rothwell, Figg, Ernst & Manbeck, P.C.

(57) ABSTRACT

In embodiments, a virtual advertising platform may use a three-dimensional mapping algorithm to insert a virtual image within a digital video stream. The virtual advertising platform may apply a three-dimensional mapping algorithm to the virtual digital image, wherein the three-dimensional mapping algorithm causes the virtual digital image to be recomposited within a plurality of frames within a received two-dimensional digital data feed in place of a spatial region within the two-dimensional data feed. The mapping algorithm may enable application of analogous geometric changes to the virtual digital image that are present in the spatial region within the plurality of video frames within the two-dimensional digital video data feed, and may send the recomposited digital data feed for display to a user, wherein the recomposited digital data feed is a virtualized digital data feed that includes the virtual digital image in place of the spatial region.

10 Claims, 5 Drawing Sheets

VIRTUAL ADVERTISING PLATFORM

CROSS-REFERENCE TO RELATED APPLICATIONS

This application claims the benefit of the following commonly-owned United Kingdom and Singapore patent applications, each of which is incorporated herein by reference in its entirety: United Kingdom Patent Application No. 1114938.2, filed Aug. 31, 2011; United Kingdom Patent Application No. 1119612.8, filed Nov. 14, 2011, entitled The Chameleon Project and Singapore Patent Application No. 201106633-9, filed Sep. 14, 2011, entitled The Chameleon Project.

BACKGROUND

1. Field

The invention is related to methods and systems for inserting virtual video content into digital video data.

2. Description of Related Art

Digital advertising and video manipulation methods exist in various forms. Television systems have been developed where digital content is presented on static green screens in stadiums for example. These techniques are limited in a variety of ways and thus there exists a need for improving them.

SUMMARY

Currently, there exist methods and systems for projecting virtual video content within a fixed region of a video frame as a replacement for the content originally recording in a digital video data feed. However these methods and systems typically use a fixed-field, with defined perimeter, such as an area of a sport event's field of play, to determine the region of the digital video data feed in which to insert the virtual video content. Such methods and systems do not enable the insertion of virtual video content into a spatial region of a digital video feed that experiences area changes to that spatial region over a plurality of video frames within the digital video data feed due to, for example, the movement of a human athlete's sports jersey that is recorded in the digital video data feed.

Accordingly, there exists a need for methods and systems for inserting virtual video content into a digital video data feed where the virtual video content is spatially altered in a manner analogous to the spatial region of the digital video data feed in which the virtual content is to be placed within a recomposited digital video data feed.

In embodiments, the present invention may provide a method and system for using three-dimensional simulation to quantify the spatial alteration of a region of a two-dimensional digital video image caused by movement of the region between a first and a second video frame for at least the purposes of inserting a virtual video content item into a digital video feed. In embodiments, a virtual advertising platform may receive a two-dimensional digital video data feed and construct a three-dimensional simulation of the two-dimensional digital video data feed within a simulation environment based at least in part on applying geometric surfaces over a plurality of spatial regions within frames of the two-dimensional digital video data feed, wherein the plurality of spatial regions are defined at least in part by a coordinate mapping of the two-dimensional digital video data feed. The virtual advertising platform may map a spatial region, among the plurality of spatial regions, within a first video frame to the spatial region's location with a second video frame, wherein the second video frame was captured in a time subsequent to the first frame, by performing the steps of: Step One: selecting the spatial region within the first video frame based at least in part on mapping coordinates of the spatial region within the two-dimensional video data feed; Step Two: identifying geometric changes to the spatial region within the second video frame by quantifying the differences between the applied geometric surfaces of the spatial region within the first video frame and the applied geometric surfaces in the second video frame; and Step Three: summarizing the quantified differences as a three-dimensional mapping metric. The virtual advertising platform may iteratively process each of a plurality of video frames within the two-dimensional digital video feed by performing Steps One, Two, and Three to create a plurality of three-dimensional mapping metrics, and may summarize quantitative associations among the plurality of three-dimensional mapping metrics as a three-dimensional mapping algorithm, wherein the three-dimensional mapping algorithm defines at least in part three-dimensional geometric position data that enables application of geometric changes to the spatial region inherent in the plurality of video frames to a virtual digital video image that is not present in the two-dimensional digital video data feed In embodiments, the virtual digital video image may be an advertisement that is inserted into the spatial region of the two-dimensional digital data feed, replacing the spatial region, and the two-dimensional digital video image is recomposited as a new virtual digital video feed. The digital video feed may derive from an infrared camera. The digital video feed may be received from a live event. The digital video feed may be received from a stored digital video medium, such as but not limited to a DVD. The digital video feed may be received from the Internet.

In embodiments, the selection within the virtual advertising platform of the spatial region may be further based on a correlation between mapping coordinates of the spatial region with a known spatial characteristic that is stored within a data facility that is associated with the three-dimensional simulation environment. The known spatial characteristic may be an advertising logo, an article of clothing, or some other type of spatial characteristic.

In embodiments, the virtual advertising platform may use a three-dimensional mapping algorithm to insert a virtual image within an internet-based video stream. The virtual advertising platform may receive a request from a user to view a two-dimensional digital video data feed from the Internet, and select a virtual digital image. The virtual advertising platform may apply a three-dimensional mapping algorithm to the virtual digital image, wherein the three-dimensional mapping algorithm causes the virtual digital image to be recomposited within a plurality of frames within the two-dimensional digital data feed in place of a spatial region within the two-dimensional data feed, and wherein the three-dimensional mapping algorithm enables application of analogous geometric changes to the virtual digital image that are present in the spatial region within the plurality of video frames within the two-dimensional digital video data feed, and may send the recomposited digital data feed for display to the user, wherein the recomposited digital data feed is a virtualized digital data feed that includes the virtual digital image in place of the spatial region. In embodiments, the request is accompanied by at least one datum relating to a characteristic of the user and the selection of the virtual digital image is based at least in part on a relevance to the datum.

The virtual digital image may be an item of sponsored content, including but not limited to an advertisement. The virtual digital image may be an advertising logo that is relevant to at least a portion of the two-dimensional digital video feed. The relevance of the advertising logo may be based at least in part on a stored association between the advertising logo and a second logo that is recognized in the two-dimensional digital video feed, wherein detection of the second logo is based at least in part on a quantified match between an image recognized in the two-dimensional digital video feed and a logo that is stored in a database. The relevance may be further based on a geographic location associated with the two-dimensional digital video feed. The relevance may be further based on a geographic location associated with a client device to which the recomposited digital video feed will be transmitted.

In embodiments, the virtual advertising platform may use a three-dimensional mapping algorithm to interpolate video data to replace corrupted digital video data and insert a virtual image within a two-dimensional digital video feed. The virtual advertising platform may receive a two-dimensional digital video data feed, wherein a spatial region within the plurality of frames within the two-dimensional video data feed includes a partial depiction of an advertisement due to corrupted digital video data, and use an image metrics algorithm to compute a relevance of uncorrupted digital video data within the spatial region to a set of stored digital video images. The virtual advertising platform may identify a stored digital video image based at least in part on the computed relevance, and select a virtual digital image based at least in part on the identified stored digital video image. The virtual advertising platform may apply a three-dimensional mapping algorithm to the virtual digital image, wherein the three-dimensional mapping algorithm causes the virtual digital image to be recomposited within a plurality of frames within the two-dimensional digital data feed in place of the spatial region within the two-dimensional data feed, and wherein the three-dimensional mapping algorithm enables application of analogous geometric changes to the virtual digital image that are present in the spatial region within the plurality of video frames within the two-dimensional digital video data feed, and the virtual advertising platform may send the recomposited digital data feed for display to a user, wherein the recomposited digital data feed is a virtualized digital data feed that includes the virtual digital image in place of the spatial region.

In embodiments, the virtual digital image may be a completed version of the partial image, wherein the virtual digital image is created based at least in part on interpolated digital video data using the stored digital video image. The corrupted digital video data may be caused at least in part by a physical deformation of a object depicted within the two-dimensional digital video data feed.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF THE FIGURES

The invention and the following detailed description of certain embodiments thereof may be understood by reference to the following figures.

DETAILED DESCRIPTION

Detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a representative basis for teaching one skilled in the art to variously employ the present invention in virtually any appropriately detailed structure. Further, the terms and phrases used herein are not intended to be limiting, but rather to provide an understandable description of the invention.

The terms "a" or "an," as used herein, are defined as one or more than one. The term "another," as used herein, is defined as at least a second or more. The terms "including" and/or "having", as used herein, are defined as comprising (i.e., open transition). The term "coupled" or "operatively coupled," as used herein, is defined as connected, although not necessarily directly and not necessarily mechanically.

Figure 1:
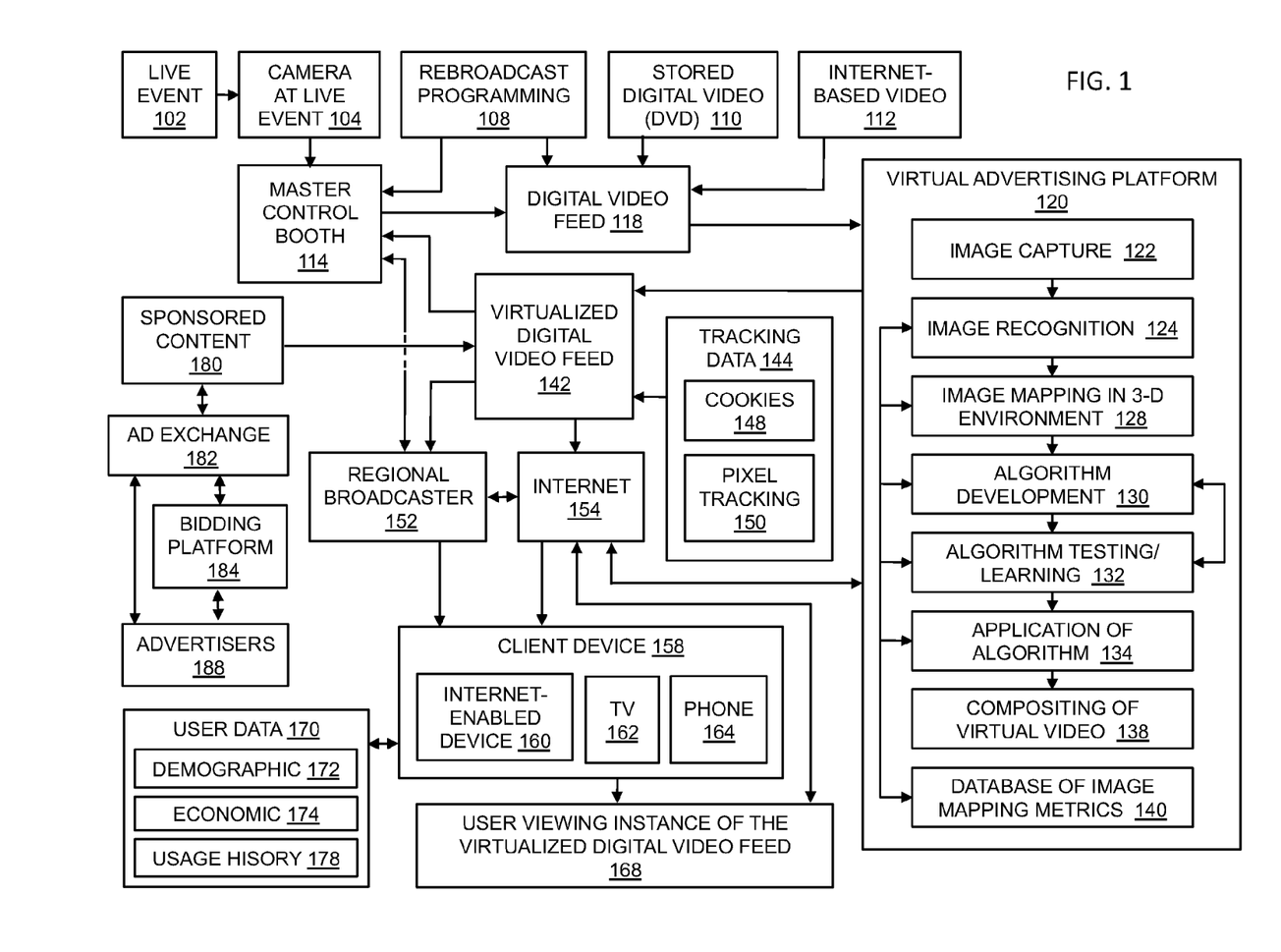
FIG. 1 depicts a simplified architecture including a virtual advertising platform and related facilities.

Referring to FIG. 1, in embodiments of the present invention, a virtual advertising platform 120 is provided in a simplified video broadcasting context in which the virtual advertising platform 120 may be used to insert virtual video content within a digital video data feed 118 that is received by a virtual advertising platform 120 to create a virtualized digital video feed 142. A digital video feed 118 may originate with a camera at a live event 104 that is recording the live event 102 in real time, or broadcasting the live event 102 with a broadcasting delay. A digital video feed 118 may also originate from rebroadcast programming 108, such as that from a network affiliate rebroadcasting previously recorded studio recordings, such as a sitcom, or a previously recorded sports event, such as an international football match. In embodiments, a digital video feed 118 may originate from a stored digital video medium 110, such as a DVD, camcorder, mobile device, computer, or some other medium that is capable of storing digital video. In embodiments, a digital video feed 118 may originate from an internet-based video platform, such as a website, email attachment, live video streaming (e.g., a webcam or an internet telephony program, such as Skype), computer user upload to the internet (e.g., to a website such as www.YouTube.com), or some other means of internet-based video transmission.

In embodiments, the virtual advertising platform 120 may receive the digital video feed 118. The receipt of the digital video feed 118 may be passive, as in the embodiment of a third party actively sending the digital video feed 118 to the virtual advertising platform 120 that passively receives the digital video feed 118, or the virtual advertising platform 120 may actively seek out and obtain a digital video feed 118, including actively seeking to obtain a digital video feed 118 or plurality of digital video feeds that meet a criterion. In an example, the virtual advertising platform 120 may be programmed to compare a dataset against a datum or data relating to digital video feeds, such as keywords, locations, broadcast locations, or some other criteria. The virtual advertising platform 120 may include a search and retrieval facility that is enabled to search among available digital video feeds 118 according to a criterion or criteria. For example, the virtual advertising platform 120 may search a website for a digital video feed 118 that is associated with a keyword of "music video," and retrieve the video, for example via download, for further rendering and recompositing within the virtual advertising platform 120.

A digital video feed 118 may be received by the virtual advertising platform 120, which performs a series of steps to recomposite the digital video feed 118 as a virtualized digital video feed 142 in which the originally received digital video feed 118 is rendered to include at least one component of virtual video content (e.g., an advertisement) that was not present in the originally received digital video feed 118. In embodiments, the virtual video content may be a wholly new element of video or it may be an improvement or enhancement of an item of video content found in the originally received digital video feed 118, such as a new video enhancement which corrects corrupted video data and/or video data in the original digital video feed 118 that was obscured in some manner.

Figure 2:
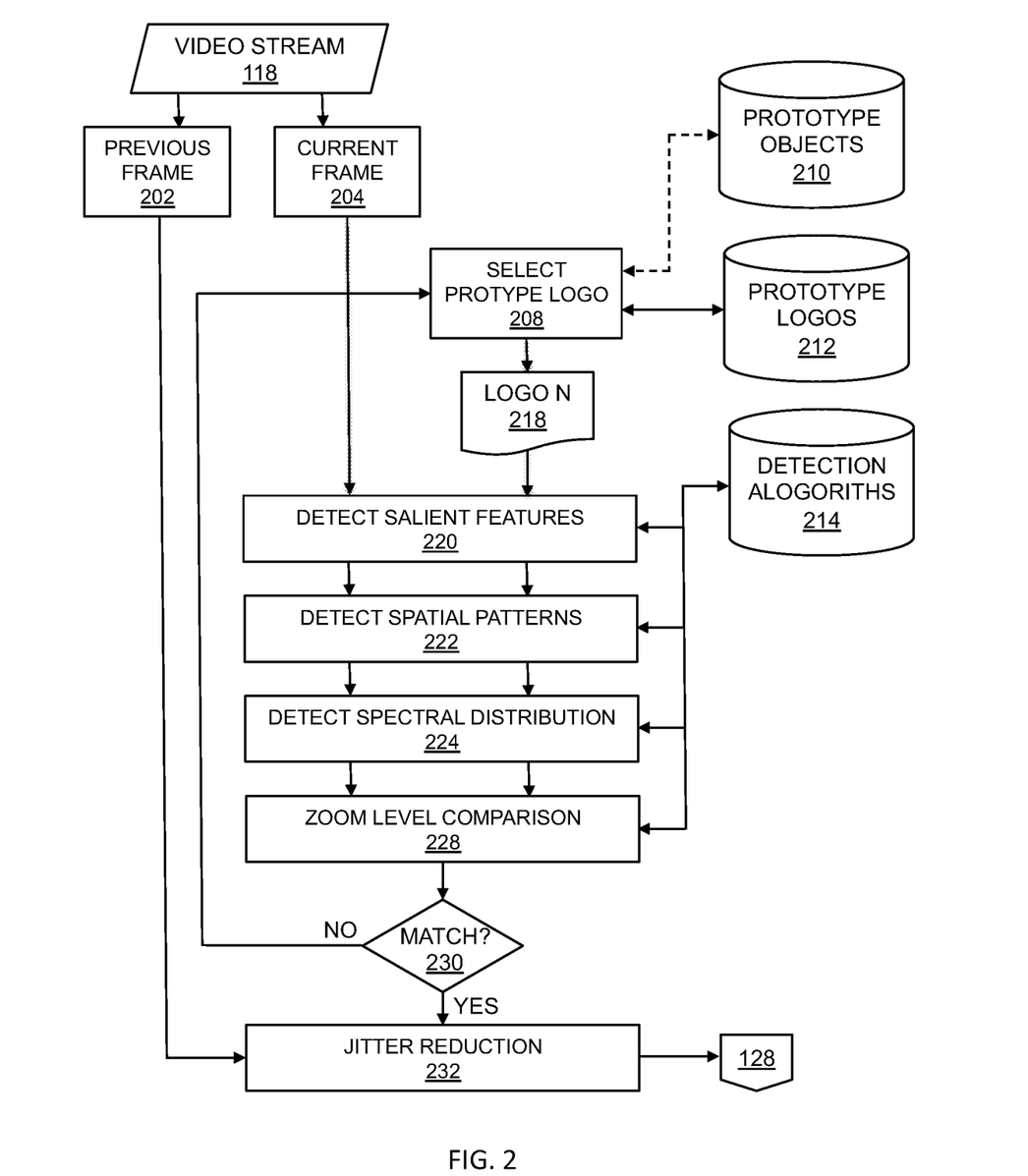
FIG. 2 illustrates an embodiment of image capture and recognition that may be used by the virtual advertising platform.

Referring to FIG. 2, in embodiments, an image-processing platform associated or within the virtual advertising platform 120 may be responsible for analyzing an incoming digital video feed 118 (also referred to herein as a "video," "video content," "video stream," and the like) in real-time, performing the detection of logos or other video content, including but not limited to advertising content, recovering geometrical and appearance parameters for the detected logos or detected content, and transmitting encoded metadata required for later augmentation with replacement logos.

The process may begin with the virtual advertising platform 120 decoding an incoming digital video feed 118, using a current frame 204 or a frame previous 202 to a current frame, thus extracting raw color pixels for analysis. The process may be used to select a prototype logo 208, herein referred to as Logo N, for detection in the current frame 204 and/or previous frame 202 based at least in part by accessing detection databases consisting of any number of prototype logos 212 for a particular event, as well as an optional database consisting of event-specific prototype images of objects 210 upon which logos are present (background targets). In embodiments, the a logo within the digital video feed 118 may be detected based at least in part on a partial match or recognition of a logo or other type of video content within the digital video feed 118. The prototype images in the detection databases may undergo an image analysis step in which the information, including but not limited to the following, is extracted in order to form a unique representation of the logo (and optionally the background targets):

The virtual advertising platform 120 may enable detection of salient features 220, where the salient regions consist of heterogeneous regions within an otherwise generally symmetrical or homogenous image.

The virtual advertising platform 120 may enable detection of spatial patterns 222, where the spatial patterns consist of the encoding of textures and uniform color/intensity regions together with their spatial relationships.

The virtual advertising platform 120 may enable detection of spectral distribution 224, where the spectral distribution consists of a summary of color and intensity information.

The virtual advertising platform 120 may enable a zoom level comparison 228, and the algorithm, as described herein, that is used as part of image recognition and detection may enable adaptation to a plurality of zoom levels that are present within the video feed.

Figure 3:
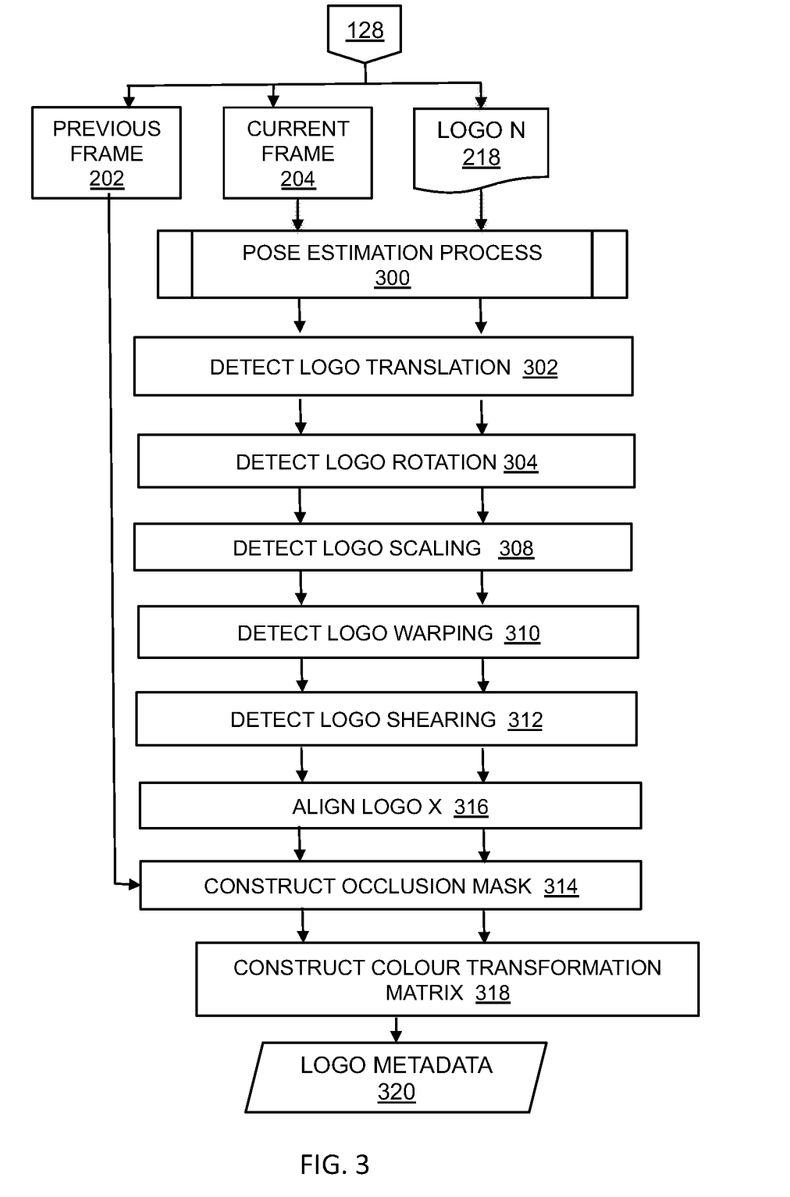
FIG. 3 illustrates an embodiment of video image mapping within a three-dimensional environment that may be used by the virtual advertising platform.
Figure 4:
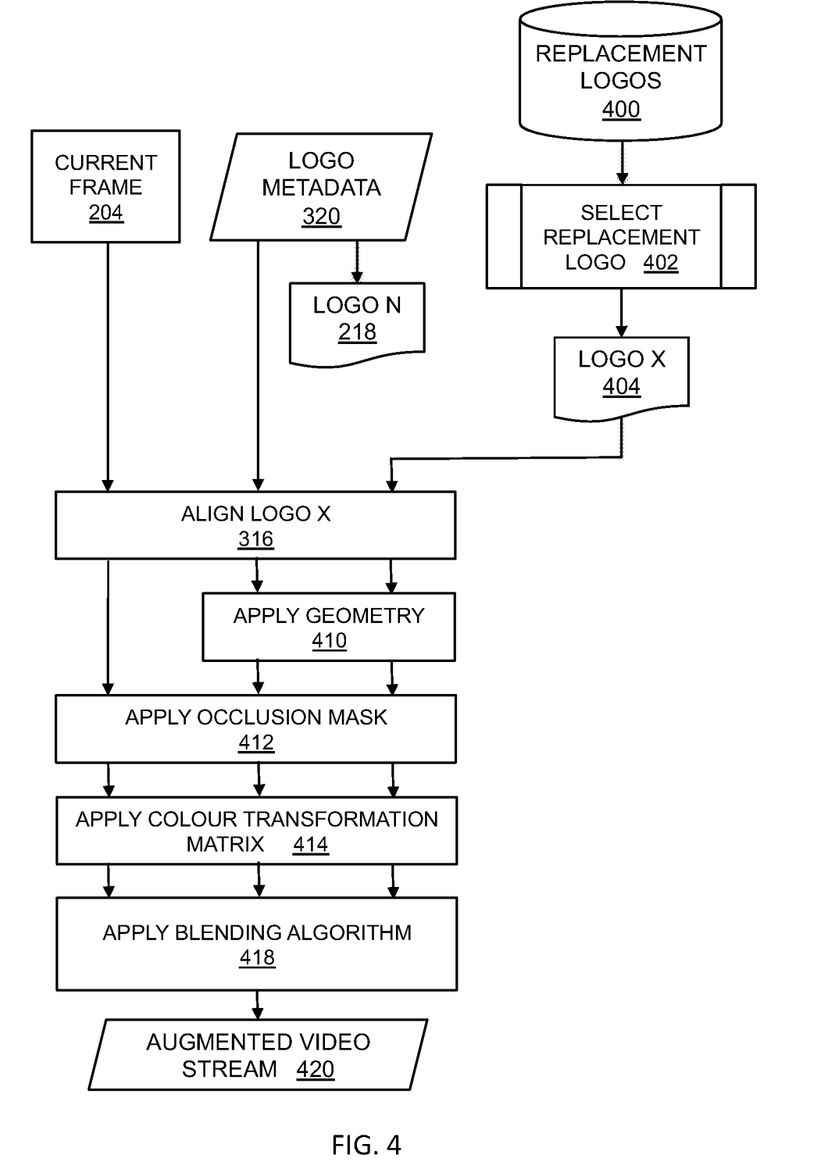
FIG. 4 illustrates an augmentation process that may be used for recompositing a video data to include a virtual video content within the virtual advertising platform.

An incoming video image may undergo a similar extraction of saliency, spatial patterns and spectral distribution, followed by a comparison between these characteristics and those of prototype logos (detection). The detection phase may carry out comparisons between the various features at multiple scales of zoom, and may be able to detect multiple instances of the same logo. The same process may be carried out for each logo in the database in order to determine a match 230 between the video image in the received video stream 118 and the stored image or logo (e.g., Logo N) in the prototype logos 212 and/or prototype objects 210 databases. Temporal smoothing of detection results may be based on storage of detections from previous image frames, making use of physical constraints and predictive filtering to reduce jitter 232. The detection phase may indicate locations and identities of logos in the scene, which as shown in FIG. 3, may be followed by a pose-estimation algorithm process in which the geometrical positioning of the detected logo in the scene is ascertained within a 3-D environment 128. This accounts for detecting logo translations 302, logo scalings 308, logo rotations 304, shearing 312 and warping 310 of a detected logo as compared to a database prototype, resulting in metadata 320 encoding of these spatial parameters. A detected and geometry-corrected logo may undergo an alignment procedure in order to reconstruct a pixel to pixel mapping between the two logos, such as Logo N 218 from the digital video feed 118 and a Logo X 404 obtained from a replacement logos database 400 for the purpose of selecting the replacement logo 402 to insert as a virtual content item into the digital video feed 118 in place of Logo N (see FIG. 4). The Logo X may be aligned 316 and major discrepancies between the aligned pair of Logo N and Logo X may be used to construct an occlusion mask 314, based at least in part on applying geometric features 410 of the logos to the alignment step, and thus accounting for partial occlusions that exist between the camera and target, and partial obscuration due to viewing angle, or some other type of viewing obstruction or occlusion (e.g., due to folds in fabric, such as a player's jersey, or light reflection from the side of an object). The occlusion mask may be encoded into an outgoing metadata 320 structure for the augmented phase and applied 412 as part of the augmentation process. In the next phase, color-differences between a recovered logo and a prototype may be assessed, and encoded as a color transformation matrix 318 and applied 414 during the augmentation process for later correction of the augmented logo. The transformation parameters may be added to the metadata 320 structure. Similarly, specular (as opposed to uniform) lighting effects may be accounted for by detecting anomalous lighting patterns in the aligned image pair. This information may be encoded into the metadata structure for specular reflection compensation in the augmentation phase. A blending algorithm 418 may involve extracting pixel properties in the vicinity of the detected logo. These properties may be encoded into the metadata 320 structure to allow for a natural blending at the augmentation phase, particularly at the edges of replacement logos 400. The blending algorithm may be used to create an augmented video stream 420. The augmented video stream may be a virtualized digital video stream 142 that may be transmitted to other entities and client devices 158 for viewing.

Figure 5:
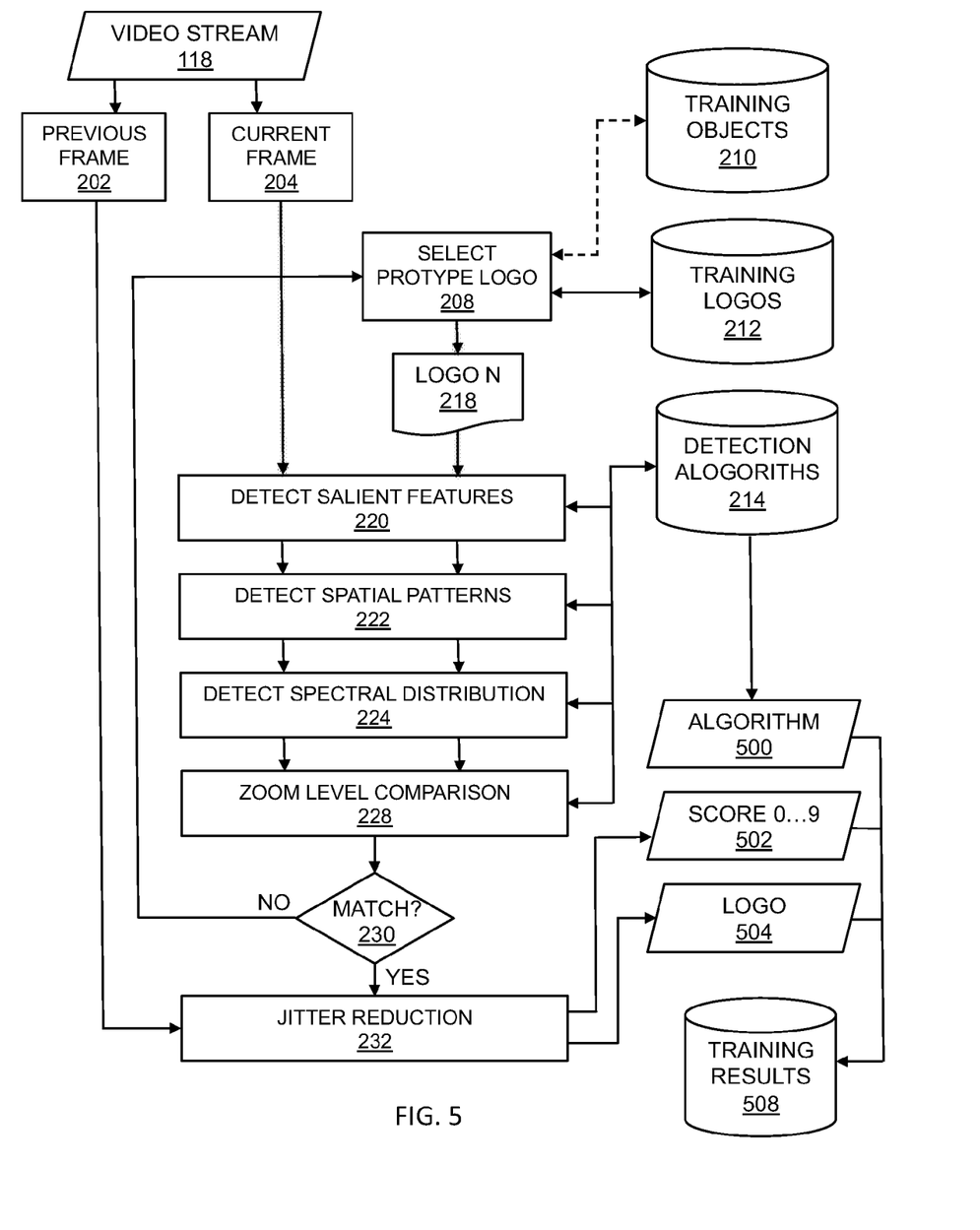
FIG. 5 illustrates a simplified method and system for developing and testing algorithms within the virtual advertising platform.

As depicted in FIG. 5, the virtual advertising platform 120 may include an algorithm testing and learning facility that may rank, prioritize, and optimize the performance of the algorithms used by the virtual advertising platform 120 for the placement of virtual video content within a digital video feed. Following the detection of an algorithm 214, as described herein, a detected algorithm 500 may be tested against a criterion and its performance scored 502, ranked or otherwise evaluated for its value in recognizing and detecting a target logo 504.

Referring again to FIG. 1, in embodiments, following the compositing of the virtual video element within the originally received digital video feed 118, a virtualized digital video feed may be created and distributed by the virtual advertising platform 120. The virtualized digital video feed may be distributed to entities such as, but not limited to, a master control booth 114, such as that associated with a network broadcaster, a regional broadcaster 152, such as a local affiliate of a network broadcaster, the internet 154, such as a website, or some other entity capable of receiving a video distribution. Data and/or metadata may be associated with the virtualized digital video feed 142 including, but not limited to tracking data 144, such as cookies 148 or pixel tracking 150 data, that permits the distribution of the virtualized digital video feed 142 to be tracked, recorded, and shared with parties, including the virtual advertising platform 120. An entity, such as a regional broadcaster 152, internet 154 website, or some other entity may receive the virtualized digital video feed 142 and transmit it to a client device 158 including, but not limited to, an internet-enabled device 160, TV 162, phone 164, or some other device capable of displaying a digital video. A user of the client device 158 may then view an instance of the virtualized digital video feed 168, and data confirming this viewing instance may be further transmitted, for example on the basis of the tracking data, to an entity, such as the virtual advertising platform 120. The virtual advertising platform 120 may receive and store this user viewing data, along with a plurality of users' viewing data, and use this information at least in part for the purposes of determining a relevancy for a type of virtual video content to insert within a digital video feed 118. User data 170, such as demographic 172, economic 174, and usage history, relating to a user may be associated with a client device 158, and this data may also be received and stored by the virtual advertising platform 120, along with a plurality of users' data, and use this information at least in part for the purposes of determining a relevancy for a type of virtual video content to insert within a digital video feed 118.

In embodiments, virtual video content that is used by the virtual advertising platform 120 to include within a virtualized digital video feed 168 may be sponsored content 180, such as an advertisement. Sponsored content 180 may be further associated with an ad exchange 182 or ad network within which advertisers 188 may place bids using a bidding platform 184 for the right to have a given sponsored content 180 placed as a virtual content within a virtualized digital video feed 168.

In embodiments of the present invention the virtual advertising platform 120 may be used to insert virtual content other than advertisements or sponsored content, including but not limited to, entertainment video, amateur video, special effects, of some other type of non-advertising content.

In embodiments of the present invention the virtual advertising platform 120 may be used to insert virtual video content into a three-dimensional digital video data feed.

In embodiments of the present invention, the virtual advertising platform 120 may receive a digital video data feed. A digital video data feed may derive from a 2-D camera, a 3-D camera, an infrared camera, a stereoscopic camera, or some other type of camera. The virtual advertising platform 120 may map a region within a first video frame of the digital video data feed to the region within a second video frame by performing the steps of: (i) selecting the region within the first video frame based at least in part on recognition of data (e.g., pixel data, steganographic data) within the region matching that of a video data criterion (e.g., indexed image/video segments of known advertisements); (ii) selecting the region from a second video frame within the digital video data feed, captured by the stereoscopic camera at a time subsequent to the first frame, and associating the first location of the region in three-dimensional video space in the first video frame with the second location of the region in three-dimensional video space in the second video frame, wherein the association is based at least in part on quantitative analysis, as described herein, of data within the region in the first and second frames; and (iii) summarizing and storing the association as a three-dimensional mapping metric. The virtual advertising platform 120 may segment the region into a plurality of region segments, and iteratively processing the plurality of region segments within the region by performing Steps i, ii, and iii for each region segment to create a plurality of three-dimensional mapping metrics, wherein each three-dimensional mapping metric summarizes a location within the three-dimensional space for each of the plurality of region segments across each of the frames within the digital video data feed. The virtual advertising platform may summarize the association among the plurality of three-dimensional mapping metrics as a three-dimensional mapping algorithm, and a replacement video region may be mapped to the region within the first video frame, wherein the mapping is a quantitative association of data (e.g., pixel data, steganographic data) within the replacement video region and the region within the first video frame. The virtual advertising platform may manipulate video data of the replacement video region, based at least in part on the application of the three-dimensional mapping algorithm, to render a second version of the replacement video region suitable for placement within the second video frame, wherein the rendering of the replacement video region is visually and/or quantitatively equivalent to the alteration in three-dimensional space of the region in the first and second frames that is summarized by the three-dimensional mapping metric.

In embodiments of the present invention, the virtual advertising platform 120 may receive a digital video data feed. A digital video data feed may derive from a 2-D camera, a 3-D camera, an infrared camera, a stereoscopic camera, or some other type of camera. The virtual advertising platform 120 may map a region within a first video frame of the digital video data feed to the region within a second video frame by performing the steps of: (i) selecting the region within the first video frame based at least in part on recognition of data (e.g., pixel data, steganographic data) within the region matching that of a video data criterion (e.g., indexed image/video segments of known advertisements); (ii) selecting the region from a second video frame within the digital video data feed, captured by the stereoscopic camera at a time subsequent to the first frame, and associating the first location of the region in three-dimensional video space in the first video frame with the second location of the region in three-dimensional video space in the second video frame, wherein the association is based at least in part on quantitative analysis of data within the region in the first and second frames; and (iii) summarizing and storing the association as a three-dimensional mapping metric. The virtual advertising platform 120 may segment the region into a plurality of region segments, and iteratively processing the plurality of region segments within the region by performing Steps i, ii, and iii for each region segment to create a plurality of three-dimensional mapping metrics, wherein each three-dimensional mapping metric summarizes a location within the three-dimensional space for each of the plurality of region segments across each of the frames within the digital video data feed. The virtual advertising platform may summarize the association among the plurality of three-dimensional mapping metrics as a three-dimensional mapping algorithm, and a replacement video region may be mapped to the region within the first video frame, wherein the mapping is a quantitative association of data (e.g., pixel data, steganographic data) within the replacement video region and the region within the first video frame. The virtual advertising platform may manipulate video data of the replacement video region, based at least in part on the application of the three-dimensional mapping algorithm, to render a second version of the replacement video region suitable for placement within the second video frame, wherein the rendering of the replacement video region is visually and/or quantitatively equivalent to the alteration in three-dimensional space of the region in the first and second frames that is summarized by the three-dimensional mapping metric. In embodiments, the virtual advertising platform 120 may iteratively manipulate video data of a plurality of replacement video regions, based at least in part on the application of the three-dimensional mapping algorithm, wherein the iterative manipulation produces a plurality of replacement video regions, each of which corresponds to one frame of a series of series of frames within the digital video data feed. The virtual advertising platform 120 may aggregate each of the plurality of replacement video regions to create a plurality of composite replacement video images, wherein each of the plurality of composite replacement video images corresponds to each of the frames of the series of frames within the digital video data feed. Each of the composite replacement video images may be validated against a criterion replacement image, wherein the validation is summarized as a quantitative validity metric, and the three-dimensional mapping algorithm may iteratively adjust to optimize the predictive validity of the quantitative validity metric.

In embodiments of the present invention, the virtual advertising platform 120 may recomposite the digital data feed into a new digital data feed in which the placement of the composite replacement video images is substituted for content within the digital video feed, and rebroadcast the new digital data feed.

In embodiments of the present invention, the virtual advertising platform 120 may enable data interpolation to fill in missing video imagery due to obfuscation from, for example, sun reflection or dimmed lighting, folded clothing, blocked images, obfuscated images and the like.

In embodiments of the present invention, the virtual advertising platform 120 may insert tracking data into a recomposited virtual video feed so that downstream usage may be tracked (e.g., internet-streamed content).

In embodiments of the present invention, the virtual advertising platform 120 may use a distributed computing environment and receive video data at a server from a digital video data feed (e.g., from a Master Control Booth) and segment the video data into a plurality of video data segments, distributing the plurality of video data segments to a plurality of servers (wherein the plurality of servers are within a distributed computing environment).

In embodiments of the present invention, the virtual advertising platform 120 may select a virtual video content for placement within a digital video data feed (using the methods described herein), wherein the selection is based at least in part on information relating to at least one of (i) a broadcast affiliate. (ii) a regional code associated with a distribution destination, and/or (iii) a device on which the digital video feed will be displayed (e.g., a cable settop box or cell phone).

In embodiments of the present invention, the virtual advertising platform 120 may place a virtual video content into a video data feed based at least in part on the selection of a virtual video content from a dictionary in which video content stored within the dictionary is associated with metadata that describes in part a mapping onto known advertisements for which the video in the dictionary may be substituted.

In embodiments, an ad exchange 182 may be associated with the virtual advertising platform 120, as described herein, may present a mode of enabling advertisements through various online portals such as websites by creating a platform for integrating various entities involved in the preparation and delivery of sponsored content 180, such as advertisements. It may act as a single platform for enabling transactions between the advertiser and publishers. The integration of various services in a single platform may facilitate bidding of advertisements, for example using a bidding platform 184 in real-time, dynamic pricing, customizable reporting capabilities, identification of target advertisers and market niches, rich media trafficking, algorithms for scalability, yield management, data enablement, and the like. In addition API's for interfacing with other platforms (e.g. the virtual advertising platform 120), ad networks, brokers, and the like may be provided in order to build a globally distributed facility for seamless integration. An ad exchange 182 may be implemented through various electronic and communication devices that may support networking Some examples of such devices may include but are not limited to desktops, palmtops, laptops, mobile phones, cell phones, and the like. It may be understood by a person ordinarily skilled in the art that various wired or wireless techniques may be employed to support networks of these devices with external communication platforms such as Cellular, WIFI, LAN, WAN, MAN, Internet and the like. A complete system of an ad exchange 182 hereinafter referred to as an ad exchange 182 for descriptive purposes may include entities such as ad exchange 182 servers, ad inventories, ad networks, ad agencies, advertisers, publishers, virtual advertising platform 120 facilities, and the like. The detailed description of some of these entities is provided herein, separately for simplicity of the description.

An ad exchange 182 server may include one or more servers that may be configured to provide web services or other kind of services for facilitating placement of sponsored content 180, such as insertion of sponsored content 180 on websites. Likewise, an ad exchange 182 server may be a computer server, such as a web server, that may perform the tasks of storing online advertisements and delivering the advertisements to website users or viewers, mobile network providers, other platforms such as a virtual advertising platform 120, and the like. The ad exchange 182 server may facilitate display of relevant advertisements and information each time a visitor or a user visits a webpage using a web browser or refreshes the web page. The advertisements may be in the form of virtual video content, banner ads, contextual ads, behavioral ads, interstitial ads and the like. The ad exchange 182 server may perform the task of keeping a log of the number of impressions and clicks, record traffic data number of users, IP address of the users for identifying spam and the like. Logs may be utilized for creating statistical graphs for analyzing traffic flow of packets, routing paths and the like. Further, a database may be maintained by the ad exchange 182 server to store information related to the users of webpages and client devices 158 and to store their behavioral and contextual information. This behavioral and contextual information may be used by the ad exchange 182 server, and by the virtual advertising platform 120, to present relevant advertisements to the user in the form of virtual video content that is inserted into a digital video feed 118. For example, contextual information relating to a client device 158 may indicate that a language setting on the device is set so that the default language is "English." This contextual information may be used at least in part by the virtual advertising platform 120 to select virtual video content that is based on English for insertion within a digital video feed 118 in place of non-English elements present in the digital video feed 118. The database may be updated by the ad exchange 182 server periodically or when triggered by an ad exchange 182 server owner. The database may be a standalone database or may be a distributed database, and may be further associated with the virtual advertising platform 120.

In embodiments, a publisher may be an owner of an ad exchange 182 server. Such a deployment may be called a local ad exchange 182 server since the ad exchange 182 server is controlled and maintained by the publisher and the ad exchange 182 server may serve only the publisher. However, an ad exchange 182 server may also be deployed and hosted by a third party. Such a deployment is called a third party server or a remote server since the owner of the ad exchange 182 server and the web server are different. In this scenario, a direct link may be maintained between the ad exchange 182 server owner (third party) and the publisher to keep the publisher updated regarding online advertisements on the web page and any transaction therein. In a remote server mode of deployment of the ad exchange 182 server, the ad exchange 182 server may serve numerous domains owned by various publishers differently.

In accordance to various embodiments of the present invention, several other tasks may be performed by the ad exchange 182 server. The ad exchange 182 server may assist in uploading advertisements or any other similar content on the web page, including loading content, such as digital video feeds 118 to the virtual advertising platform 120. The ad exchange 182 server may also facilitate in downloading a downloadable content of the advertisements or a portion of the advertisements as defined by the restrictions imposed by advertisers. Further, an ad exchange 182 server may also be utilized in avoiding ads trafficking on a web page or web pages. The trafficking may be avoided based on the defined criteria and parameters regarding business and commercial viabilities and importance.

In embodiments, an ad exchange 182 server may apply a cap or a limit to the number of times a sponsored content, such as virtual video content, is displayed, thereby setting a limit on the usage based on the money invested for online advertisements. In other instances, an ad exchange 182 server may disable the display of certain advertisements based on the user's context and behavior. Furthermore, the time period for displaying advertisements to users may be controlled by the ad exchange 182 server, and this information used by the virtual advertising platform 120 for the purposes of selecting the type of virtual content to include in a virtualized digital video feed 142. In an example, the time period may be set uniform for all users or may vary for various users based on the behavioral, contextual, or other information gathered by the ad exchange 182 server or contextual information previously stored in a database, including a database that is associated with the virtual advertising platform 120. In certain implementations of the present invention, the ad exchange 182 server may inform the sequence of advertisements used by the virtual advertising platform 120 for placing virtual content within a digital video feed, base at least in part on the interests and user data 170 of a user.

In embodiments, owners of ad inventories may be advertisers who desire to display the content such as virtual content that is placed by the virtual advertising platform 120 within a digital video feed 118, and the like. The advertisers may purchase a portion of space within a digital video feed 118 for the display of their inventories and advertisements. Ad inventories may be stored in or accessed by an ad exchange 182 server, or the virtual advertising platform 120, from where the inventories may be fetched for displaying within a digital video feed 118. These inventories may then be added to the allocated space within a digital video feed by the virtual advertising platform 120, and /or the owner of a digital video feed 118. The allocation of space to the ad inventories and display of the content of the ad inventories may be governed by the ad exchange 182 Server and/or by parameters within the virtual advertising platform 120.

In embodiments, an advertiser is a buying entity in an ad exchange 182 that may provide sponsored content 180, advertisements and other similar content to parties that are capable of placing the content, including the virtual advertising platform 120 that is enabled to place video content within a digital video feed 118. In a general scenario, thousands of advertisers may be connected to numerous publishers through ad exchange 182 servers. The advertisers might not be directly linked to an ad exchange 182 server, but rather an intermediate system such as an ad network or an ad agency may be provided where various advertisers may be linked or represented in the ad exchange 182. Advertisers may place bids for purchasing a defined space within a virtualized digital video feed 142 for the placement of sponsored content 180, such as advertisement and the space required for the advertisements with other relevant details. The advertisements may be classified by the virtual advertising platform 120 according to the criteria defined in an intermediate system such as costs, contexts, relevancy of the content relative to digital video feed 118 content and the like. Classified sponsored content 180 may then be sorted and prioritized by the virtual advertising platform 120 and the advertiser with the highest bid may be provided the required space to place sponsored content 180 within a virtualized digital video feed 142. Advertisers may also opt for purchasing the space from several publishers of digital video feeds 118.

In embodiments, a publisher may be a seller who owns or operates display locations, such as websites, that are able to display digital video feeds 118 and virtualized digital video feeds 142, and to sell a defined space to the advertisers on a, for example, web page. Advertisers may interact with publishers through the intermediate system, such as an ad network, an ad exchange 182, through the virtual advertising platform 120, and the like as described herein for buying or selling purposes. Publishers may allocate the space within a digital video feed 118, and the virtual advertising platform 120 may add sponsored content, video inventory or advertisement content, in the form of video, within the allocated space. Publishers and/or the virtual advertising platform 120 may forecast the number of impressions that may occur during a particular period of time such as a day or a month on a specific web page. With this forecasted information and the information related to the already allocated space, publishers and/or the virtual advertising platform 120 may predict the amount of space that may further be sold. This space that may further be sold to an advertiser or an agent or any other buying entity may be termed as an asset. The publisher and/or the virtual advertising platform 120 may also classify the inventories and video media based on several criteria as defined herein. The categorization may be performed either manually or using an automated system such as by a programmed algorithm. The manual classification may involve persons that may review and analyze the video content of digital video feeds 118 and based on the review and analysis the video content may be classified into various categories. The classification may also be performed through automated system such as through a virtual advertising platform 120 as described herein. A programmed algorithm for automated classification may be stored in the virtual advertising platform 120 which is enabled to review and analyze digital video feeds 118 and classify the digital video feeds 118 into defined categories. The classification technique may provide an additional advantage to the publishers and advertisers in several ways. For example, by estimating the level of relevancy of a video inventory, sponsored video content, or advertising content to a given digital video feed 118, the publisher may demand higher charges since the probability of gaining interest in the advertising content is higher while the user views a virtualized digital video feed 142 in which a relevant sponsored video content 180 is inserted. Similarly, a digital video feed 118 may be prioritized as more relevant if it is more probabilistic that a greater number of video viewings will be made per unit time. Data relating to the viewing history of digital video feeds 118 may be collected, stored and analyzed by the virtual advertising platform 120.

In embodiments, an ad exchange 182 may implement algorithms, which may allow the publishers to price ad impressions during bidding in real-time. Apart from selecting the bidder on predefined criteria, an ad exchange 182 may ensure that the bids submitted by the advertisers may neither be undervalued nor overvalued. An ad exchange 182 may automatically generate maximum return on every impression. In addition, the reporting of sales data may be presented to the publishers in a simplified format for easy understanding. The publishers may be authorized to identify the brands and/or product preferred by them for placement of ad impressions. Likewise, an ad exchange 182 may allow the publishers to restrict certain brands, contents, formats, and like based to their preferences.

In embodiments, ad networks may be a group of publishers and/or advertisers that are connected together. An ad network may be an organization or an entity that may connect web sites that want to host advertisements with advertisers who want to run advertisements. An ad network may be of categorized as a representative network, blind network, and targeted network. Representative networks allow full transparency of content to the advertisers. On the other hand, blind networks may provide a low price to advertisers at the cost of the freedom to decide the placement of advertisements on the publisher's web page. Target networks may be directed to specific targeting technologies including analyzing behavioral or contextual information of the users, as described herein, and as may be collected, stored and analyzed by the virtual advertising platform 120.

In embodiments, the virtual video content that is available through the virtual advertising platform 120, created within the virtual advertising platform 120, or associated with the virtual advertising platform 120 may be syndicated to users' client devices 158 using a syndication facility based at least in part on using contextual information associated with the virtual video content, and/or content similar to the virtual video content and including sponsored content 180, in order to determine the relevancy, using a relevancy determination facility, of virtual video content to a criterion, such as a keyword associated with the virtual video content, usage history of the content, and/or metadata that is associated with the virtual video content. Relevancy may be based at least in part on a relevancy between contextual data associated with the virtual video content and user data 170. In an example, a virtual video content selection criterion may be derived by the virtual advertising platform 120 based at least in part on a user's prior usage of, and behaviors within, a client device 158, including but not limited to prior video viewings made on the client device 158, such as an internet-enabled device 160. For example, a user viewing a virtualized digital video feed 142 on a client device 158 that derives from the virtual advertising platform 120 may have previously searched, retrieved, used, or interacted with virtual video content that is associated with metadata, such as an URL indicating an amateur video posting website like YouTube, or a keyword such as "The World Cup." An automated program running within or in association with the virtual advertising platform 120, or affiliated with the virtual advertising platform 120, may recognize keywords, metadata, or other material within this prior-viewed video content that indicates a relevance to the virtual video content genre "Sports." Based at least in part on this, the user may be associated with a user profile datum/data indicating that the user is interested in sports. The selection of the virtual video content to syndicate to a user may be based at least in part on the user data and user profile data indicating an interest in sports may be automated, initiated individually by the virtual advertising platform 120, and/or initiated by the user or creator of virtual video content that is available within or associated with the virtual advertising platform 120, for example video content that is submitted to a website for manipulation, such as YouTube.

Contextual information that may be associated with video content may also include keywords, terms, or phases located within or associated with the video content and/or virtual video content, the links to video content, the links from video content, click patterns and clickthroughs associated with prior use of the video content (including click patterns and clickthroughs associated with sponsored content appearing in association with the virtual video content), metadata, video content usage patterns including time, duration, depth and frequency of video content usage, the video content's origination host, genre(s) relating to the video content, and other indicia of video content context.

The relevancy of the contextual information associated with video content may be indicated through the use of a relevancy score. The relevancy score may be a numerical summary of the statistical association between, for example, contextual video and virtual video content parameters (e.g., genre of video content) and user parameters (e.g., genres of video content previously downloaded by user). The relevancy score may be a proprietary score assigned to a video content or virtual video content by the virtual advertising platform 120, or third party service provider that is associated with the virtual advertising platform 120. The relevancy scores of a syndicated virtualized video content may be stored in a virtual video content relevance dictionary.

In embodiments, usage patterns may be obtained from a database of user data 170 and/or metadata relating to users of the virtual advertising platform 120. A wide range of usage patterns may be used to assist with formation of queries (implicit and explicit) and with retrieval and organization of video content search results, such as that presented to a recipient of a virtualized video data feed 142 from the virtual advertising platform 120. An algorithm facility may include one or more modules or engines suitable for analyzing usage patterns to assist with such functions in forming a query. For example, an algorithm facility may analyze usage patterns based on time of day, day of week, day of month, day of year, work day patterns, holiday patterns, time of hour, patterns surrounding transactions, patterns surrounding incoming and outgoing video content, patterns of clicks and clickthroughs, patterns of communications, and any other patterns that can be discerned from data that is used within, or in association with the user data 170 and/or a client device 158 on which video content is viewed. Usage patterns may be analyzed using various predictive algorithms, such as regression techniques (least squares and the like), neural net algorithms, learning engines, random walks, Monte Carlo simulations, and others as described herein.

In embodiments, an API, or plurality of API's may be provided to enable and facilitate the management and use of user data, such as user profiles, and the operation of syndication within or in association with the virtual advertising platform 120.

In embodiments, the determination of relevance, relevancy, associations, correspondence, and other measures of correlation and relationships between virtual video content, users, and metadata associated with both, as described herein, may be made based at least in part on statistical analysis. Statistical analysis may include, but is not limited to techniques such as liner regression, logistic regression, decision tree analysis, Bayes techniques (including naïve Bayes), K nearest neighbors analysis, collaborative filtering, data mining, and other statistical techniques may be used.

In an example, linear regression analysis may be used to determine the relationship between one or more independent variables, such as user profile data, and another dependent variable, such as a datum associated with a virtual video content (e.g., author name, genre, and the like), and modeled by a least squares function, called a linear regression equation. This function is a linear combination of one or more model parameters, called regression coefficients.

In another example, Bayes theorem may be used to analyze user profile and/or video content data and virtual video content, such as contextual data that is associated with video content, data relating to virtualized digital video feeds 142 that are created by the virtual advertising platform 120, or some other type of data used within the virtual advertising platform 120. Using Bayes thereom, conditional probabilities may be assigned to, for example, user profile variables, where the probabilities estimate the likelihood of a video content or virtual video content viewing and may based at least in part on prior observations of the users' prior interactions with video content. Naïve Bayes classifiers may also be used to analyze video content and virtual video content data. A naive Bayes classifier is a probabilistic classifier based on applying Bayes' theorem with strong (naive) independence assumptions. A naive Bayes classifier assumes that the presence (or lack of presence) of a particular feature of a class is unrelated to the presence (or lack of presence) of any other feature. For example, a user of video content may be classified in a user profile as interested in video content related to Singapore if he has previously searched for, retrieved, downloaded, used, and/or interacted with video content, or other type of content, related to Singapore, responded to virtual video content related to Singapore, and the like. A Bayes classifier may consider properties, such as prior use of Singapore video content, prior downloads of Singapore-related video content, searches for Singapore video content and the like to independently contribute to the probability that this user is interested in Singapore-related video content and may respond well to virtual video content, such as advertisements, that are related to Singapore and organizations within Singapore. Once a classification is assigned within the user profile (e.g., User X=Singapore Fan), the user's information may be stored and shared by the virtual advertising platform 120 (e.g., sending the data to an ad server where the classification "Singapore Fan" may be used to select Singapore-related sponsored content, such as virtual video content to be used by the virtual advertising platform 120, to deliver to the user is association with the delivery and presentation of Singapore-, or other subject-related content). A single user profile may include a plurality of classifiers. For example, the Singapore fan's user profile may also include classifiers indicating that the user is a "native English speaker," or an "online poker player," and so forth, using the data that is associated with the user's actions and behaviors within the user dataset 170, and any other data sources as described herein. An advantage of the naive Bayes classifier is that it may require a small amount of training data to estimate the parameters (means and variances of the variables) necessary for classification. Because independent variables are assumed, only the variances of the variables for each class need to be determined and not the entire covariance matrix. This characteristic of naïve Bayes may enable the classification.

In embodiments, a behavioral data analysis algorithm may be used for developing behavioral profiles for use by the virtual advertising platform 120 for the selection of video content and virtual video content to be included in a virtualized digital video feed 142 that will be presented to a client device 158. Behavioral profiles may then be used for targeting advertisements and other virtual video content. A behavioral profile may include a summary of a user's video viewing activity, including the types of content and applications accessed, and other behavioral properties. The user's activity summary may include searches, browses, purchases, clicks, impressions with no response, or some other activity as described herein. The behavioral properties may be summarized as continuous interest scores of a video content category, past responsiveness to virtual video content (e.g., transactions made following viewing of advertising virtual video content), or some other property. Continuous frequency scores and continuous recency scores (e.g., how recently the activity occurred) may be considered as behavioral properties for use in constructing a behavioral profile. A user's activity summary and the behavioral properties may be categorized using the analytic techniques as described herein (e.g., naïve Bayes classifiers). Video content data, and its characteristics, and sponsored content, such as virtual video content, that may be associated with the presentation of video content to a user (e.g., an advertisement), may also be used for the generation of a behavioral profile. For example, data such as advertisement identity, ad tag, user identity, advertisement spot identity, date, and user response may be used. In addition, content categories may be used for targeting virtualized digital video feeds 142 to users' client devices and/or advertisements based on a behavioral profile, or portion of a behavioral profile. Further, content categories may be associated with each search, browse, download, purchase, or other online behavioral activities and/or transactions.

A program of automatically syndicating virtual video content to a user may be based at least in part upon the relevance of contextual data associated with the video content and information known about a user, or group of users (e.g., user profile data, as described herein). The automation of syndicating video content and virtualized digital video feeds 142 may be based at least in part on associating metadata with the virtual video content. Contained within the metadata may be information regarding the relevance of the virtual video content to various users and/or user groups. An example of only one of the many examples of how a metadata may contain relevance information may include: metadata indicating the relevance of a virtual video content to a user based at least in part on the user data 170, data related to the user's client device (e.g., a video playback capability), or some other type of data and/or metadata indicating the average relevancy score that is associated with a video content viewing by a user from a given user category, and the like.

In embodiments, a server application, or plurality of server applications, designed for retrieving video content using the virtual advertising platform 120 may read search websites, syndication feeds, or other content and/or data looking for video content to use as part of creating a virtualized digital video feed 142 using the virtual advertising platform 120. In another embodiment, the virtual advertising platform 120 may be associated with a database or plurality of databases in which the URLs or other data corresponding to and identifying video content and entities having stored video content. Once the server(s) confirms the website or other video content storage location is to receive and/or provide syndicated video content, including receiving virtualized digital video feeds 142 from the virtual advertising platform 120, the server may automatically receive, tag, and/or provide video content to the website or other entity, and/or send virtualized digital video feed 142 content to the website. In embodiments, a tag may be provided by any number of different entities or sources. For example, the tag may be provided by the virtual advertising platform 120, a third party tagging service, or some other tagging provider.

In embodiments, an automated video syndication program and/or virtualized digital video feed 142 syndication program, may derive revenue, for example through a flat fee, revenue sharing, or no-fee service program offered to an advertiser, website, ad exchange, ad network, publisher, television broadcaster, or some other entity. In embodiments, parties such as a user of a client device 158 that is capable of playing video may be required to pay a usage fee to access, create, aggregate, and/or interact with virtual content and the creation, use, distribution, and viewing of virtualized digital video feeds 142. In another embodiment, sponsored content such as an advertisement may be presented to a user in conjunction with the presentation of virtual video content. The owner of the sponsored content, or other interested party, may be required to pay a fee for the right to present the sponsored content to a user's client device in the form of a virtualized digital video feed 142 that is created by the virtual advertising platform 120. This revenue may be shared among the virtual advertising platform 120 and a third party (e.g., website owner). Revenue may be derived from sponsors of virtual video content participating in the automated syndication program. Fees may be derived from the sponsors of virtual video content, a competitive bidding process, auction, flat fee service, or the like. The fee structure and bidding may be based at least in part on a relevancy score associated with a virtual video content.

In embodiments, data integration techniques and methods may be used as part of the virtual advertising platform 120, as described herein, to collect, join, merge, validate, analyze, and perform other data processing operations for digital video data, virtual video content data, user data, client device data (e.g., applications used to interact with virtual video content), and other data types as described herein. Data integration techniques and methods may be used to take the information collected from a plurality of digital video data sources in order to draw an inference from the collected information, identifying a potential change to a database based on newly received information, and validating the change to the database based on the inference.

In embodiments, data integration techniques and methods may be used to extract information from a plurality of digital video data sources, and the like, the data sources having a plurality of distinct data types, transforming the data from the data sources into a data type that can be represented in, for example, a database to be used by a virtual advertising platform 120, the database thereby integrating information from the distinct data types.

In embodiments the distinct data types may be selected from a group consisting of content data, user data, contextual information relating to video content and virtual video content, user behavioral information (including user profiles), demographic information, usage history, and other data sources and types as described herein. In embodiments, data integration techniques and methods may be used to apply rules, such as by a rules engine, in connection with creation, updating and maintenance of a data set, such as one stored or used in association with a virtual advertising platform 120. A rules engine may be applied to secondary change data, that is, data that comes from one or more data sources and that indicates that a change may be required in a data set or to inference data, that is, data derived by inferences from one or more data sets. For example, a rule may indicate that a change in a data set will be made if a secondary data source confirms an inference, or if an inference is consistent with data indicated by a data source. Similarly, a rule might require multiple confirmations, such as requiring more than one data source or more than one inference before confirming a change to a data set (or creation of a new feature or attribute in the data set). Rules may require any fixed number of confirmations, whether by other data sets or by inferences derived from those data sets. Rules may also embody various processes or work flows, such as requiring a particular person or entity to approve a change of a given type or a change to a particular type of data.

In embodiments, data integration techniques and methods may be used to extract information from a plurality of digital video data sources, the data sources having a plurality of distinct data types, storing the data in a common data set, considering a change request associated with a database, such as a database that is associated with a virtual advertising platform 120, and using the common data set to validate the change request.

In embodiments, data integration techniques and methods may be used to extract information from a plurality of digital video data sources, the data sources having a plurality of distinct data types, storing the data in a common data set, considering the common data set to identify potential changes to a database, such as a database that is associated with an virtual advertising platform 120, and initiating a change request based on the common data set.

In embodiments, a data integration facility may be used to integrate data from a plurality of digital video data sources, the data sources including attributes relevant to an virtual advertising platform 120, wherein the data integration facility is selected from the group consisting of an extraction facility, a data transformation facility, a loading facility, a message broker, a connector, a service oriented architecture, a queue, a bridge, a spider, a filtering facility, a clustering facility, a syndication facility, and a search facility.

In embodiments, a data integration facility may be used to integrate data from a plurality of digital video data sources, taking an inference drawn from analysis of data collected by a plurality of data sources, applying a data integration rule to determine the extent to which to apply the inference, and updating a data set based on the application of the rule.

In embodiments, a data integration facility may be used to integrate data from a plurality of digital video data sources, taking an inference drawn from analysis of data collected by a plurality of data sources, applying a data integration rule hierarchy to determine the extent to which to apply the inference, and updating a data set based on the application of the rule.

In embodiments, a data integration facility may provide a rule hierarchy to determine a data type to use in a data set related to a system, such as an virtual advertising platform 120, the rule hierarchy applying a rule based on at least one of a data item, the richness of a data item, the reliability of a data item, the freshness of a data item, and the source of a data item and representing the rule hierarchy in a data integration rule matrix, wherein the matrix facilitates the application of a different rule hierarchy to a different type of data.

In embodiments, a data integration facility may be used to integrate data from a plurality of digital video data sources, taking an inference drawn from analysis of data collected by a data sources, applying a data integration rule matrix to determine the extent to which to apply the inference, and updating a data set based on the application of the rule.

A data integration facility may be used in association with a system, such as a virtual advertising platform 120, to iteratively collect and make inferences about data that is collected for use in the virtual advertising platform 120. Iteration may be performed a plurality of times, or continuously, as an on-going process to collect and make inferences about data attributes. Iteration may be a function of the entire data set (e.g., an entire virtual video content usage history of a user), or a function of specific data segments (e.g., virtual video content usage history<24 hours). Data attributes may be stored for subsequent comparison to previously collected data inference attributes. In embodiments, this process may be continuous, and represent an ongoing comparison of inferred attributes for the purpose of detecting differences over time.

The data integration facility may include at least one of a bridge, a message broker, a queue and a connector. Therefore, a useful data source may be associated with a data integration facility via computer code, hardware, or both, that establishes a connection between the source and the data integration facility. For example, the bridge may include code that takes data in a native data type (such as data in a mark-up language format), extracts the relevant portion of the data, and transforms the data into a different format, such as a format suitable for storing the data for use in an virtual advertising platform 120, or by users of the virtual advertising platform 120. The message broker may extract data from a data source (e.g., website), place the data in a queue or storage location for delivery to a target location (e.g., virtual advertising platform 120 server), and deliver the data at an appropriate time and in an appropriate format for the target location (e.g., to a user of the virtual advertising platform 120). In embodiments, the target location may be a virtual advertising platform 120 database, a data mart, a metadata facility, or a facility for storing or associating an attribute within the virtual advertising platform 120. The connector may comprise an application programming interface or other code suitable to connect source and target data facilities, with or without an intermediate facility such as a data mart or a data bag. The connector may, for example, include AJAX code, a SOAP connector, a Java connector, a WSDL connector, or the like.

In embodiments, the data integration facility may be used to integrate data from a plurality of digital video data sources, the data sources including attributes relevant to, for example the virtual advertising platform 120. The data integration facility may include a syndication facility. The syndication facility may publish information in a suitable format for further use by computers, services, or the like, such as in aid of creating, updating or maintaining a virtual advertising platform 120 database, such as one related to user behavioral profiles, publishers, or some other type of data used by the virtual advertising platform 120, as described herein. For example, the syndication facility may publish relevant data in RSS, XML, OPML or similar format, such as user data, wireless operator data, ad conversion data, publisher data, and many other types of information that may be used by the virtual advertising platform 120. The syndication facility may be configured by the data integration facility to feed data directly to a virtual advertising platform 120 database, such as a user profile database, in order to populate relevant fields of the database with data, to populate attributes of the database, to populate metadata in the database, or the like. In embodiments the syndicated data may be used in conjunction with a rules engine, such as to assist in various inferencing processes, to assist in confirming other data, or the like.

In embodiments, the data integration facility may include a services oriented architecture facility. In the services oriented architecture facility, one or more data integration steps may be deployed as a service that is accessible to various computers and services, including services that assist in the development, updating and maintenance of a virtual advertising platform 120 database, such as a user profile database, or the like. Services may include services to assist with inferences, such as by implementing rules, hierarchies of rules, or the like, such as to assist in confirmation of data from various sources. Services may be published in a registry with information about how to access the services, so that various data integration facilities may use the services. Access may be APIs, connectors, or the like, such as using Web Services Definition Language, enterprise Java beans, or various other codes suitable for managing data integration in a services oriented architecture.

In embodiments, the data integration facility may include at least one of a spidering facility, a web crawler, a clustering facility, a scraping facility and a filtering facility. The spidering facility, or other similar facility may thus search for data, such as available from various domains, services, operators, publishers, and sources, available on the Internet or other networks, extract the data (such as by scraping or clustering data that appears to be of a suitable type), filter the data based on various filters, and deliver the data, such as to a virtual advertising platform 120 database. Thus, by spidering relevant data sources, the data integration facility may find relevant data, such as user behavioral data, contextual data relating to content, publisher data, and many other types (of the types variously described herein) of information. The relevant data may be used to draw inferences, to support inferences, to contradict inferences, or the like, with the inference engine, such as to assist in creation, maintenance or updating of an virtual advertising platform 120 database. The data may also be used to populate data fields directly, to populate attributes associated with data items, or provide metadata.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

What is claimed is:

1. A system for using three-dimensional simulation to quantify the spatial alteration of a region of a two-dimensional digital video image caused by movement of the region between a first and a second video frame, the system comprising a computer having a non-transitory computer readable medium having stored thereon instructions which, when executed by a processor of the computer, causes the processor to perform the steps of:

receiving a two-dimensional digital video data feed;

constructing a three-dimensional simulation of the two-dimensional digital video data feed within a simulation environment based at least in part on applying geometric surfaces over a plurality of spatial regions within frames of the two-dimensional digital video data feed, wherein the plurality of spatial regions are defined at least in part by a coordinate mapping of the two-dimensional digital video data feed;

mapping a spatial region, among the plurality of spatial regions, within a first video frame to the spatial region's location with a second video frame, wherein the second video frame was captured in a time subsequent to the first frame, by performing the steps of:

Step One: selecting the spatial region within the first video frame based at least in part on mapping coordinates of the spatial region within the two-dimensional video data feed;

Step Two: identifying geometric changes to the spatial region within the second video frame by quantifying the differences between the applied geometric surfaces of the spatial region within the first video frame and the applied geometric surfaces in the second video frame; and Step Three: summarizing the quantified differences as a three-dimensional mapping metric;

iteratively processing each of a plurality of video frames within the two-dimensional digital video feed by performing Steps One, Two, and Three to create a plurality of three-dimensional mapping metrics; and summarizing quantitative associations among the plurality of three-dimensional mapping metrics as a three-dimensional mapping algorithm, wherein the three-dimensional mapping algorithm defines at least in part three-dimensional geometric position data that enables application of geometric changes to the spatial region inherent in the plurality of video frames to a virtual digital video image that is not present in the two-dimensional digital video data feed.

2. Further comprising the system of claim 1, wherein the virtual digital video image is an advertisement that is inserted into the spatial region of the two-dimensional digital data feed, replacing the spatial region, and the two-dimensional digital video image is recomposited as a new virtual digital video feed.

3. The system of claim 1, wherein the digital video feed derives from an infrared camera.

4. The system of claim 1, wherein the digital video feed is received from a live event.

5. The system of claim 1, wherein the digital video feed is received from a stored digital video medium.

6. The system of claim 5, wherein the stored digital video medium is a DVD.

7. The system of claim 5, wherein the digital video feed is received from the Internet.

8. The system of claim 1, wherein the selection of the spatial region is further based on a correlation between mapping coordinates of the spatial region with a known spatial characteristic that is stored within a data facility that is associated with the three-dimensional simulation environment.

9. The system of claim 8, wherein the known spatial characteristic is an advertising logo.

10. The system of claim 8, wherein the known spatial characteristic is an article of clothing.

* * * * *